United States Patent
Collins et al.

(10) Patent No.: US 6,687,761 B1
(45) Date of Patent: Feb. 3, 2004

(54) PROCESS CONTROL METHODS AND APPARATUS WITH DISTRIBUTED OBJECT MANAGEMENT

(75) Inventors: William J. Collins, Ashland, MA (US); Bruce S. Canna, Mansfield, MA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 09/026,008

(22) Filed: Feb. 19, 1998

Related U.S. Application Data
(60) Provisional application No. 60/037,539, filed on Feb. 20, 1997.

(51) Int. Cl.[7] .................................................. G06F 9/44
(52) U.S. Cl. ........................................ 709/315; 709/316
(58) Field of Search .................................. 709/315, 316

(56) References Cited

U.S. PATENT DOCUMENTS

| | | | |
|---|---|---|---|
| 4,493,027 A | | 1/1985 | Katz et al. |
| 4,649,479 A | | 3/1987 | Advani et al. |
| 5,303,375 A | | 4/1994 | Collins et al. |
| 5,303,392 A | | 4/1994 | Carney et al. |
| 5,343,554 A | * | 8/1994 | Koza et al. .................. 706/13 |
| 5,359,721 A | | 10/1994 | Kempf et al. |
| 5,444,851 A | | 8/1995 | Woest |
| 5,457,797 A | | 10/1995 | Butterworth et al. |
| 5,463,735 A | | 10/1995 | Pascucci et al. |
| 5,481,715 A | * | 1/1996 | Hamilton et al. ............ 709/316 |
| 5,499,365 A | * | 3/1996 | Anderson et al. ............ 700/182 |
| 5,504,895 A | * | 4/1996 | Kurosawa et al. ............. 707/8 |
| 5,517,655 A | | 5/1996 | Collins et al. |
| 5,522,044 A | | 5/1996 | Pascucci et al. |
| 5,539,909 A | | 7/1996 | Tanaka et al. |
| 5,572,673 A | | 11/1996 | Shurts |
| 5,581,760 A | | 12/1996 | Atkinson et al. |
| 5,586,329 A | | 12/1996 | Knudsen et al. |
| 5,586,330 A | | 12/1996 | Knudsen et al. |
| 5,594,899 A | | 1/1997 | Knudsen et al. |

(List continued on next page.)

OTHER PUBLICATIONS

Reverbel, Francisco C.R. et al. "Making CORBA Objects Persistent: the Object Database Adapter Approach". USENIX. Jun. 1997.*
Dollimore, Jean. "Object–based Distributed Systems". Dec. 7, 1997. pp. 1–45.*
"The Common Object Request Broker: Architecture and Specification" Revision 2.0, Jul. 1995 (Updated Jul. 1996).
"CORBA 2.1 Update Sheet" Aug. 1997.

*Primary Examiner*—John Follansbee
*Assistant Examiner*—Lewis A. Bullock, Jr.
(74) *Attorney, Agent, or Firm*—David J. Powsner; Nutter, McClennen & Fish; David Barron

(57) ABSTRACT

The invention provides improved digital data processing systems with distributed object management for use, e.g., in process control. These systems are of the type having servers and, more particularly, object request brokers (ORB's) that route requests generated by one or more clients to implementation objects maintained by a server application. Routing is based on a binding table (or other such store) that identifies dispatching procedures, or "skeletons," that invoke requested services on implementation objects specified in the requests. Such systems may be CORBA-compatible, though the improvements provided by o the invention are applicable to distributed object management systems having other architectures, as well. The improvements are characterized by the utilization of a single entry in the binding table (or other such store) to route requests to a plurality of different implementation objects, e.g., representing process control blocks and parameters, maintained by the server. In a related aspect, the improvements can be characterized as providing an CORBA-compatible ORB or, more particularly, (basic) object adapter (OA), that permits requests to be routed to implementations that are not listed in the binding table.

7 Claims, 2 Drawing Sheets

U.S. PATENT DOCUMENTS

Figure 1:
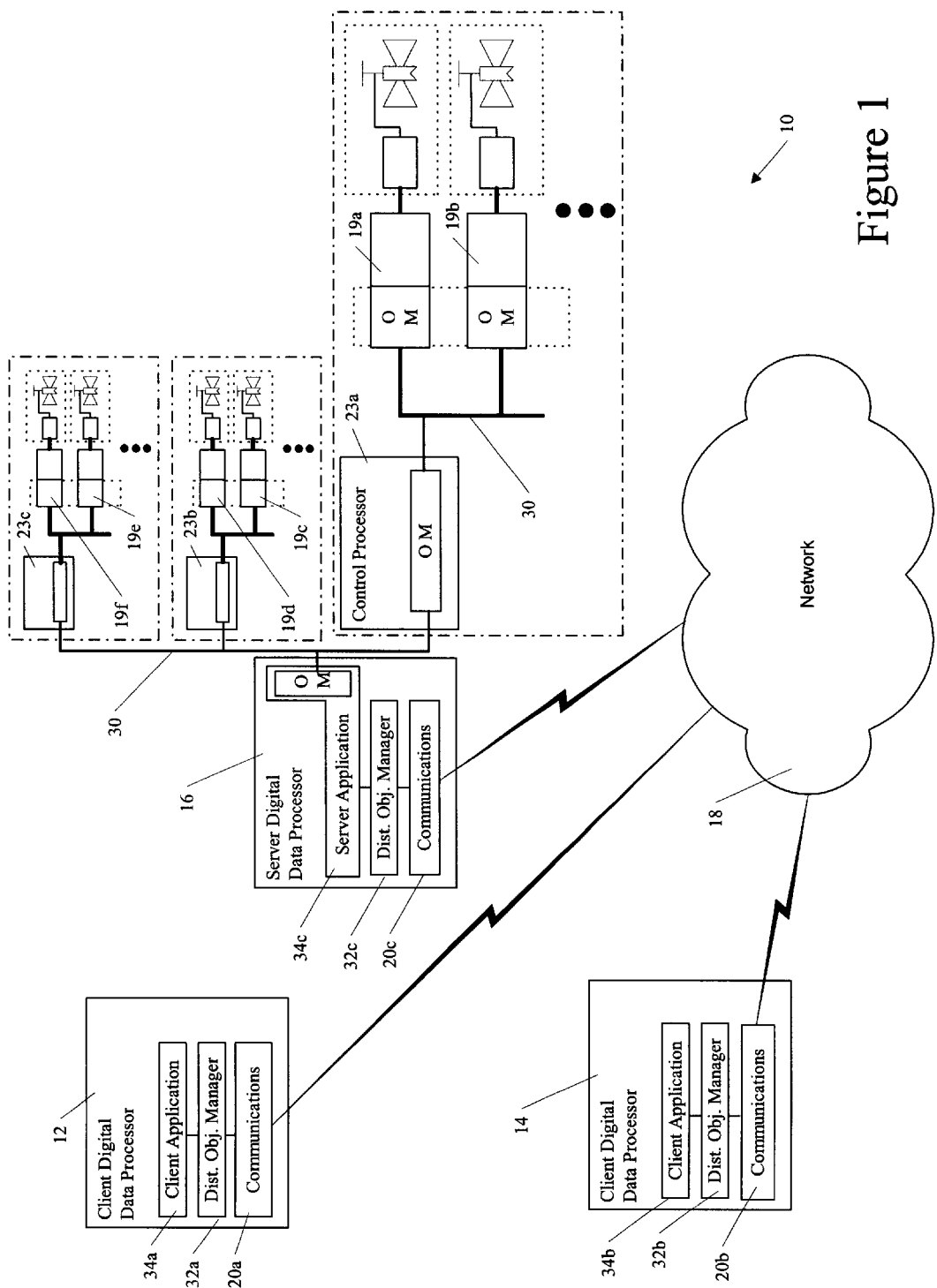

| | | | |
|---|---|---|---|
| 5,596,752 A | | 1/1997 | Knudsen et al. |
| 5,613,148 A | * | 3/1997 | Bezviner et al. ............ 709/203 |
| 5,617,540 A | | 4/1997 | Civanlar et al. |
| 5,627,979 A | | 5/1997 | Chang et al. |
| 5,642,511 A | | 6/1997 | Chow et al. |
| 5,692,183 A | * | 11/1997 | Hapner et al. .............. 707/100 |
| 5,734,902 A | * | 3/1998 | Atkins et al. ............... 709/213 |
| 5,793,965 A | * | 8/1998 | Vanderbilt et al. .......... 709/201 |
| 5,832,268 A | * | 11/1998 | Anderson et al. ........ 707/104.1 |
| 5,928,335 A | * | 7/1999 | Morita ....................... 709/203 |
| 5,969,967 A | * | 10/1999 | Aahlad et al. .............. 370/254 |
| 5,991,823 A | * | 11/1999 | Cavanaugh et al. ........ 709/330 |
| 6,009,266 A | * | 12/1999 | Brownell et al. ........... 709/315 |
| 6,272,557 B1 | * | 8/2001 | Lim et al. ................... 709/315 |
| 6,353,860 B1 | * | 3/2002 | Hare et al. .................. 709/316 |

\* cited by examiner

PROCESS CONTROL METHODS AND APPARATUS WITH DISTRIBUTED OBJECT MANAGEMENT

REFERENCE TO RELATED APPLICATIONS

This application claims the benefit of priority of U.S. provisional patent Application Serial No. 60/037,539, filed Feb. 20, 1997, the teachings of which are incorporated herein by reference.

RESERVATION OF COPYRIGHT

The disclosure of this patent document contains material that is subject to copyright protection. The owner thereof has no objection to facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The invention concerns digital data processing for process control and, more particularly, novel mechanisms for assigning and managing object references in process control systems with distributed object management systems.

The art of digital data processing has progressed considerably in its first forty years. Well known are the advancements in computer hardware, for which ever more powerful microprocessor is the best known example. No less impressive is the evolution in computer software.

In the earliest computer programs, there were no abstractions. Programming instructions and data alike were coded directly in the forms in which they were to be executed by the primitive processors, to wit, as strings of ones and zeros. With the vent of programming languages such as FORTRAN, it became possible to code instructions as words and symbols. Data could be named and grouped into arrays to facilitate their reference.

Through use of the early languages, and with initial improvements in hardware, computer programs came to solve increasingly difficult tasks. Unfortunately, the programs themselves became too complex for trouble-shooting, maintenance and upgrading. Modularity, which was then coming to influence other technologies, came to the aid of the software arts as well.

Using block programming languages and techniques, programmers began to write long sequences of instructions as smaller independent segments that could be designed, tested and maintained separately. These segments, especially those packaged as subroutines, often did not share a common pool of data but, rather, passed information back and forth on an as-needed basis.

Modularity also impacted the manner in which data was referenced. Data constructs became richer, reflecting increased use of computers outside the once traditional confines of mathematics and engineering. Simple data arrays gave way to records and other structures that permitted the agglomeration of varying types of data, typically, matching the diversity of attributes in the real-world objects that they modeled.

The trend toward modularity brought more far-reaching changes with the advent of object-oriented programming. According to this practice, which is just now beginning to overtake the industry, data are packaged in structures that also include the specific procedures that act on them. These structures, or objects, can be transferred along with their attendant procedures, thereby, improving the instruction/data coherency and facilitating trouble-shooting, maintenance and updates.

The growth of distributed computing over the Internet and corporate intranets has made it desirable to utilize objects among diverse computer systems, often operating at great distances. The Object Management Group, a consortium of computer companies, responded to this need by establishing CORBA, a protocol for distributed object management. Using CORBA protocols, a "client" computer, e.g., in Japan, can access an object resident on a "server" computer in Massachusetts, all via the exchange of CORBA-specific request and response packets.

CORBA can be used in a wide variety of applications, including process control. The central computer at a manufacturing facility or refinery, for example, can employ the protocol to control and monitor the status of substations or individual microprocessor-based controllers disposed about the facility. Moreover, corporate oversight may be attained via a remote computer, e.g., at corporate headquarters, which can use the protocol to obtain information from the plant's central computer.

Though CORBA represents a much welcomed advance to the digital data processing arts, certain applications can unnecessarily overburden it. This may be the case, for example, in process control, or other complex software application, where servers must provide potential access to large numbers of objects.

In process control, for example, the central computer of a manufacturing or refining facility may oversee an average of 25 control processors, each of which can manage roughly 75,000 control blocks, having approximately 50 parameters apiece. To provide "clients" (such as a computer corporate headquarters) full access to plant operations, the central plant computer must potentially provide access to 3,750,000 objects, that is, the objects representing all of the processors, control blocks and parameters. To add the insult of underutilization to the injury of enormous capacity, the clients—in practice—are likely access only a few hundred or thousand of those objects during any session. According to the conventional CORBA approach, administrative structures (such as binding table entries and object references) necessary to service requests to the 3,750,000 objects would be created regardless.

In view of the foregoing, an object of the invention is to provide improved digital data processing systems and, more particularly, improved methods and apparatus for managing object references in distributed object systems.

A more specific object of the invention is to provide such methods and apparatus as are suited for use in managing object references in CORBA-compatible distributed object management systems.

Yet a further object of the invention is to provide such methods and apparatus as reduce the resource and overhead requirements for implementation of distributed object management, e.g., on systems where servers are called upon to provide access to large numbers of objects.

A related object of the invention is to provide such methods is to provide such methods and apparatus for use in providing distributed object management for process control systems, and other complex systems.

SUMMARY OF THE INVENTION

The foregoing and other objects are met by the invention, which provides in one aspect improvements on digital data processing systems with distributed object management.

These systems are of the type having servers and, more particularly, object request brokers (ORB's) that route requests generated by one or more clients to implementation objects maintained by a server application. Routing is based on a binding table (or other such store) that identifies dispatching procedures, or "skeletons," that invoke requested services on implementation objects specified in the request. Such systems may be CORBA-compatible, though the improvements provided by the invention are applicable to distributed object management systems having other architectures, as well.

The improvements are characterized by the utilization of a single entry in the is binding table (or other such store) to route requests to a plurality of different. implementation objects (or, for sake of convenience, "implementations") maintained by the server. In a related aspect, the improvements can be characterized as providing an CORBA-compatible ORB or, more particularly, (basic) object adapter (OA), that permits requests to be routed to implementations that are not listed in the binding table.

The invention provides systems as described above in which at least selected requests generated by the client include a pair of object identifiers (OID's). The first OID—which can be contained in the object reference supplied the server and copied into the request—is used by the server ORB and, more particularly, the OA, to locate an entry in the binding table. The second OID—which the client can obtain from the component portion of the server-supplied object reference—can identify the specific implementation from which services are requested.

The OA, according to further aspects of the invention, can match the first OID contained in a request (e.g., in the server-supplied object reference) against the binding table. A matching entry specifies a first dispatching procedure (e.g., a skeleton associated with a block implementation identified by the first OID) to which the OA applies the request. That first dispatcher, in turn, applies the request to a second dispatcher (e.g., a skeleton associated with the implementation identified by the second OID in the request). Like the second OID, the identity of that skeleton can be contained in the request.

Once in receipt of the request, the second skeleton applies it to the implementation identified by the second OID. For example, the skeleton can decode, or "unmarshall," any parameters contained in the request and pass them to the specified procedure of the implementation.

According to still further aspects of the invention, the first and second OID's in a request correspond to addressable locations, e.g., memory addresses, of first and second implementations maintained by the server application. The correspondence between the first OID and the addressable location of the first implementation (e.g., a block implementation) can be reflected in the binding table, each entry of which lists an OID, a corresponding implementation address, and a pointer to the dispatch procedure or skeleton for that implementation. Though corresponding entries can be provided in the binding table for the second OID's, they need not be—since the invention permits requests to be routed to implementations identified by the second OID's, without requiring a corresponding entries in the binding table.

According to further aspects of the invention, the implementations identified by the first and second OID's of a request are related in such a way that their respective addressable locations differ by a predetermined addressing offset. For example, the first and second implementations can comprise portions of the same object construct instantiated on the server. In a process control application, for example, an implementation identified by a second OID can comprise a parameter-represeritative object (i.e., parameter object) associated with an entry point contained on a block-representative object (i.e., block object) identified by a first OID. In this regard, the implementation identified by the first OID is seen to have an aggregating or "parent" relationship between one or more implementations that are "child objects" or "sub-objects" potentially referenceable by second OID's. As a consequence of this parent/child, object/sub-object, or aggregation relationship between the implementations identified by first and second OID's, the second OID included in an object reference can be determined from the memory address for the implementation identified by the first OID.

In further aspects of the invention, the server capitalizes on this by deferring, until necessary, creation of the administrative structures required to service requests issued to the second implementation (e.g. those representing parameters). Thus, even though those implementation objects may come into existence at the same time as their parent implementations (e.g., those representing blocks), no object reference nor binding table entry need be created until a client signals a desire to make access, for example, by requesting service from a corresponding accessor method on the parent implementation.

To this end, in a related aspect of the invention, the server generates a first object reference corresponding to the first implementation. This can be accomplished with a conventional CORBA "bind" operation, which assigns an OID to the implementation and creates an object reference containing that OID, along with certain typing and networking-related routing information. At the same time, the bind operation creates an entry in the binding table. This lists the OID assigned to the implementation, the location of the implementation, and a pointer to its associated dispatching procedure or skeleton. Upon binding the first implementation (e.g., a block implementation object), the object reference created by the server ORB can be copied to the client, thereby, enabling it to issue requests to that implementation.

To enable a client to issue a request to an implementation that is not listed in the binding table (e.g., a parameter implementation object), the server creates a "special" object reference that contains two OID's—one for the non-listed implementation and one for the listed aggregating implementation. While this can be done concurrently with creation of the object reference for the corresponding listed implementation, it can be deferred until a client signals the desire to make requests to the non-listed implementation.

The server can create such a special object reference by duplicating the object reference for the aggregating implementation and appending to that object reference the OID of the non-listed implementation. Since the duplicated object reference already contains a first OID, e.g., that of the listed implementation, appending that of the non-listed implementation results in a object reference containing two OID's. In the parlance of CORBA, the second OID is appended as a component to the object reference. Along with it can be included the address of the dispatching procedure or skeleton for the non-listed implementation. In implementations where the listed implementation has a parent or aggregating relationship to the non-listed implementation, the second OID can be determined by an address computation, e.g., by adding a predetermined offset to the memory address associated with the first OID.

By passing an object reference for a non-listed implementation to the client, the server enables that client to issue requests to that implementation. To this end, the client includes both OID's in its requests (e.g., by copying the first OID, along with the object reference, directly into the request and appending the second OID from the component portion of that object reference). When received by the server, routing of those requests proceeds in the manner described above.

Still further aspects of the invention provide methods digital data processing systems with distributed object management paralleling the operations described above.

These and other aspects of the invention are evident in the drawings and in the description that follows.

BRIEF DESCRIPTION OF THE ILLUSTRATED EMBODIMENT

Figure 2:
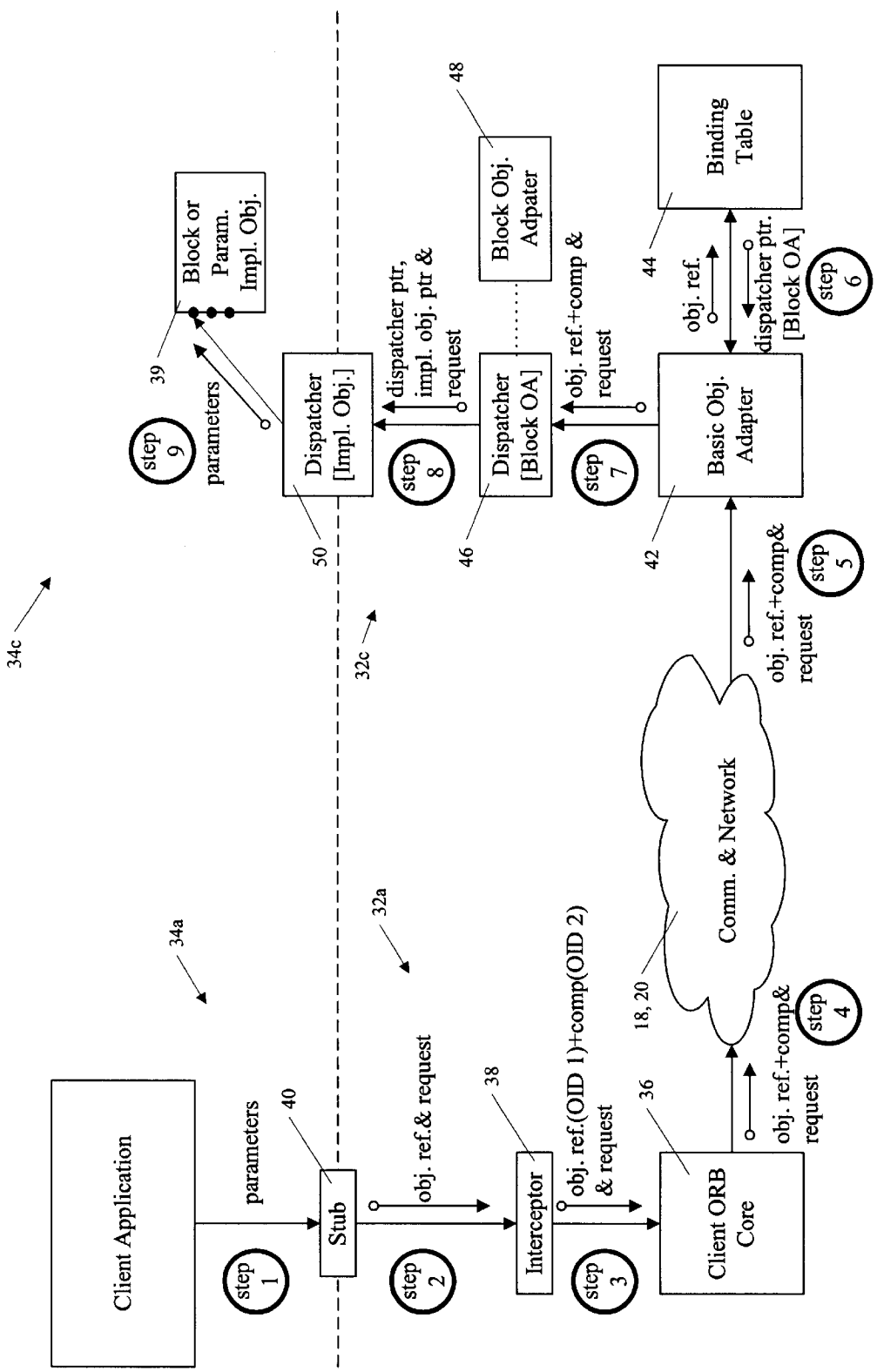

A more complete understanding of the invention may be attained by reference to the drawings, in which:

FIG. 1 depicts an digital data processing system configured for distributed object management in accord with the invention; and FIG. 2 depicts the architecture and operation of enhanced client and server object request broker's (ORB's) in the system of FIG. 1.

DETAILED DESCRIPTION OF THE ILLUSTRATED EMBODIMENT

FIG. 1 depicts an exemplary digital data processing system 10 configured in accord with the invention. The system includes multiple digital data processors 12, 14, 16, two which are denoted as "clients" 12, 14 and one which is denoted as a "server" 16. The digital data processors 12, 14, 16 are connected to one another via a communications medium, such as network 18. The indicated assignment of the roles "client" and "server" is for didactic convenience. In typical embodiments of the invention, each processor 12, 14, 16 may be configured to serve in both roles.

The illustrated embodiment represents a system 10 configured for process control, though systems according to the invention may be used in any application where distributed object management is desired. Server processor 16 represents a digital data processor enlisted, e.g., as a central computer operating on a factory floor. To this end, it is coupled to control processors 23A–23C which, in turn, are coupled to controllers 19a–19f, as indicated. Each controller 19a–19f is coupled to control/sensing devices, which are shown in the illustration as flow control valves, and associated interface equipment.

The control/sensing devices and interface equipment represent any conventional such devices of the type conventionally used to monitor and control processes—including, by way of non-limiting example, continuous, repetitive and discrete processes, and environmental control processes, among others. Controllers 19a–19f represent conventional control devices capable of monitoring and/or controlling operation of one or more control/sensing devices. By way of example, these can be PID controllers, PI controllers, and other well known control devices. These are typically employed to oversee a single operational aspect of a piece of processing equipment, e.g., pressurization of a tank.

Control processors 23a–23c represent conventional digital data processing equipment capable of monitoring and controlling groups of controllers 19a–19f. These may be used to coordinate entire suboperations within a manufacturing facility, e.g., the transfer of production intermediates and byproducts among multiple processing apparatus. In addition to monitoring and coordinating the control processors 23a–23c and their respective suboperations, the central digital data processor 16 may be used to track administrative and financial aspects of plant operations.

In advanced control systems such as those manufactured by the assignee hereof, The Foxboro Company, each aspect of system operation is represented by an object-oriented programming contruct, to wit, an object. Each controller 19a–19f, for example, may utilize such a construct to model its assigned aspect of equipment operation. Specific operational states of the subordinate control/sensing devices may also be so modelled. At the next level, control processors 23a–23c maintain objects reflecting the status of their associated controllers, as well as of their assigned suboperations. Likewise, the central digital data processor 16 uses objects to model the operational, administrative and financial status of plant operations. In the illustrated embodiment, information representing this myriad of objects are maintained and transferred among the controllers, control processors and central digital data processor with an object manager (OM) and buses 30.

(Those familiar with the I/A Series® systems referred to above will appreciate that the historical use of the term "object" in "object manager" should not be confused with use of that same term in the context of object-oriented programming. The historical use concerned a specific data type, having a scalar component and a string component, used to transfer pieces of information between processors and processes. The object-oriented programming use relates to a construct having data members and procedural members. It is in the object-oriented programming context that "object" is used throughout this document. That notwithstanding, as noted below, the invention can be applied to the OM, e.g., to the extent that the OM is implemented using distributed object management architectures, such as CORBA, as enhanced in accord with the teachings herein.)

Illustrated controllers 19a–19f, control processors 23a–23c, and central digital data processor 16, including attendant object manager OM and other software, represent commercially available digital data processing equipment available in the marketplace for process control. Preferred such equipment is commercially available from the assignee hereof, The Foxboro Company, as part of its I/A Series® industrial automation systems. Such equipment is configured and operated in accord with the teachings herein to provide improved distributed object management. Though the discussion that follows suggests use of such distributed object management to facilitate communications among digital data processors 12, 14, 16, those skilled in the art will appreciate that it is also applicable to the OM, i.e., to facilitate the control and transfer of objects amongst the controllers 19a–19f, control processors 23a–23c and central digital data processor 16.

In the illustrated embodiment, client digital data processors 12, 14 represent conventional digital data processing systems installed at the manufacturing facility or remote sites, e.g., corporate headquarters, to monitor its operations and/or to provide further information necessary to facility operation. As above, digital data processors 12, 14 are configured and operated in accord with the teachings herein to provide improved distributed object management.

The network 18 represents any communications medium, such as a conventional digital data processing network (e.g., LAN or WAN), cable television-based network, wireless network and/or any telecommunications-based network, capable of supporting communications between digital data processors 12, 14, 16. The network 18 may also comprise the global Internet and/or an enterprise-based Intranet supporting communications via the TCP/IP protocol (i.e., the current standard protocol of the Internet). Though the illustrated embodiment is directed to use of the invention among remote digital data processors 12, 14, 16, it will be appreciate that the invention is equally applicable to the distribution of objects among processes, or even tasks, operating on a single digital data processor. Illustrated communications interfaces 20a–20c are responsible for establishing communications between the processors 12, 14, 16 over network 18. In embodiments where interprocessor, interprocess or intertask communications transpire under different protocols and/or hardware structures, interfaces 20a–20c are configured and selected accordingly.

For sake of convenience, in the illustrated embodiment, server processor 16 is presumed to maintain objects reflecting the status of all factory operations, including the statuses of control processors 28a–28c, the controllers 19a–19f, and their respective control/sensing devices. Much of this information is organized hierarchically. Thus, for example, a "control block" object (hereinafter, "block object") reflects the status of each controller 19a–19f, while a "parameter" object reflects the status of each control/sensing device or other process variable. The number of distinct objects required to represent a typical process control installation can be quite large. In a manufacturing or refining facility, for example, a typical process control block object maintains average of 50 distinct parameter objects. A typical control processor (e.g., processors 23a–23c) has a capacity to maintain approximately 3000 blocks. Assuming that the average facility utilizes 25 control processors, central digital data processor 16 must potentially accommodate approximately 75 thousand block objects and 3.75 million parameter objects.

In the illustrated embodiment, server 16 permits the clients 12, 14 to gain access to all of these objects by implementing them as distributed objects in accord with an object management protocol based on enhancements to the CORBA protocol. The basic protocol is well known in the industry and is described in publications of the Object Management Group (OMG) and numerous others. One such publication is entitled *The Common Object Request Broker: Architecture and Specification*, Rev. 2.0 (1995) and *The Common Object Request Broker: Architecture and Specification*, Rev. 2.1 (1997), the teachings of which are incorporated herein by reference. Specifically the server 16 supports the generation of object references to instances of block, parameter and other objects that it maintains. This enables clients 12, 14 to issue remote method invocations directly to those objects. (As noted above, though this discussion is directed to the distribution of objects among digital data processors 12, 14, 16, the teachings herein are applicable to the distribution of objects at the OM level, i.e., amongst the controllers 19a–19f, control processors 23a–23c and central digital data processor 16.) The server 16 also enables those objects to participate in the CORBA typing system and to have names bound to them.

The enhancements provided by the invention reduce the storage and operational overhead required for the server processor 16 to permit CORBA-based object distribution. Thus, for example, the enhancements reduce the numbers of binding table entries and object references that must be created to provide remote access to services, e.g., of parameter objects.

In the illustrated embodiment, the enhancements are effected by enhanced object request brokers, which are identified in FIG. 1 as distributed object managers 32a–2c, residing in digital data processors 12, 14, 16, as shown. The object managers 32a, 32b are coupled to client applications 34a, 34b executing on processors 12, 14, respectively. As in a conventional client ORB, they convert, package and transmit to digital data processor 16 object requests issued by those applications 34a, 34b. Likewise, they return to the client applications responses from the targeted objects.

Distributed object manager 32c is coupled to server application 34c to receive the requests transmitted by the enhanced client ORB's 32a, 32b. As with a conventional server ORB, manager 32c routes those requests to the targeted objects and unpacks the parameters for application to specified object serves. It also packages and transmits back to the client managers 32a, 32b responses to the requests.

Unlike conventional ORB's, the distributed object managers 32a–32c permit the utilization of a single entry in the binding table to route requests to a plurality of different implementation objects maintained by the server 16. Correspondingly, they reduce the storage and operational overhead required for object distribution. These and other aspects and attributes of the distributed object managers 32a–32c (henceforth, simply referred to as ORB's) are detailed below and elsewhere herein.

Although the functional division between the applications and ORB's is generally established by the CORBA protocols and conventions, it can vary from embodiment to embodiment. Except where otherwise called out herein, the particular dividing lines are generally not critical. Hence, the term "client" is often used to refer to the combined operations of each client application 34a, 34b and its respective distributed object managers, or enhanced ORB's, 32a, 32b. Likewise, the term "server" is occasionally used to refer to the combined operations of the server application 34c and its enhanced ORB 32c.

Though the illustrated embodiment is built around the CORBA architecture, those skilled in the art will appreciate that the teachings herein may be applied to enhance other existing distributed object management architectures or may form a basis of new architectures altogether.

CORBA Basics

The sections that follow describe relevant aspects of conventional CORBA architecture and operation. To facilitate an understanding of these and how they relate to enhancements provided by the illustrated embodiment, reference is made to the FIG. 2 (which illustrates a system of the invention incorporating those enhancements).

CORBA is implemented at many layers, each isolating the others from unnecessary details or abstractions. At the highest layers are the client application 34a and server application 34c, executing on the client and server computers 12, 16, respectively. The server application 34c creates object, variously referred to as distributed objects, implementation objects or implementations, comprising services or procedures that are to be made available for remote access.

The client application 34a generates requests to those implementations and their services—though, not directly. Rather, the requests go through "stubs" 40. These are procedures or objects that appear (to the client application 34a) to offer the same services as a targeted implementation 39 but that, in reality, are simply interfaces. The stubs 40 cannot directly respond to the requests but, rather, package them for transfer by the client object request broker (ORB)

core 36 to the server 16. (In the illustration, the request is not routed directly to the client ORB core 36 but, rather, is intercepted by element 38, which represents an enhancement incorporated into the illustrated embodiment.) The specifics of where the request is to be directed, e.g., the network address of the server 16 and the unique identification of the targeted implementation, are contained in an "object reference" that is supplied by the server 16 to the client 12 (prior to the time of the request) and that is, essentially, copied into the request by the client.

Working through the communications interface 20 and the communications medium 18, the client ORB core 36 sends the request from the client 12 to the server 16. Typically, this entails transferring the request packet over a network, though, it can simply entail the transferring the packet between processes or tasks in a given computer.

The server ORB 32c includes a (basic) object adapter (OA) 42 that is responsible for routing requests received from the client 12 to the targeted implementation 39. To this end, the OA 42 maintains a "binding" table 44 that lists the unique object identifications (OID's) and their corresponding locations in the client application 34c. (Though conventional CORBA systems require that each implementation maintained by the server be listed in the binding table, systems according to the invention do not impose this requirement.) By comparing the OID contained in a request with the entries in the binding table, the OA 42 can find the address of the corresponding implementation object 39 and can apply the request to that to that object.

The OA 42 does not do this directly but, rather, uses a special dispatching procedure, or "skeleton" 50, that is identified in the binding table along with the OID and implementation address. The skeleton 50 is the server's 12 counterpart of the stub 40. It unpacks the request and puts the arguments encoded therein in a format suitable for application to the requested procedure of the implementation object 39. Once the skeleton 50 has applied the request to the target implementation 39, it encodes the response for re-transmission back to the client application 34a.

Though the illustrated embodiment permits requests to be routed directly from OA 42 to skeleton 50, this is not shown in FIG. 2. Rather, in the illustration, the request is routed to dispatcher 46, in accord with an enhancement provided by the illustrated embodiment.

Stubs, Skeletons and Object References

At the ORB level of both the client 12 and server 16, an instance of an implementation (e.g., block or parameter object 39) is represented by an object reference. This maintains all the information that is necessary to identify the implementation for a distributed object and drive a complete operation invocation to it. This information at a minimum includes an interface type identifier, a location identifier and an object identifier. The interface type identifier is a number which uniquely identifies the most derived IDL (interface definition language) interface supported by the implementation object 39. The location identifier is an address which uniquely identifies the communication endpoint of the server application 34c that maintains the implementation 39. The object identifier (OID) is a number which uniquely identifies the implementation within the server application 34c.

From the client application's 34a perspective, an instance of an object reference (and, therefore, of the underlying implementation 39) is represented by a stub, or more fully a stub object reference, 40. A stub object reference 40 represents the interface of the distributed object, or implementation 39, in the native programming language of the application 34a. It collaborates with the associated object reference to marshal arguments for a request (and to unmarshall arguments from the response).

In the server ORB 32c, the association between an ORB object reference and the implementation 39 it references is maintained in the ORB binding table 44. The ORB 32c maintains an ORB binding table 44 for each server application 34c registered with the ORB. Entries in these tables are called object reference bindings. An object reference binding maintains typically all the information that is necessary for the ORB 32c to locate and dispatch a request to an implementation 39 within a server application 34c. The binding contains the OID for the implementation 39, the location (address) of the implementation 39 within the server 34c and the location of the skeleton (or dispatcher) 50 within the server which will be used to dispatch requests to the implementation 39. (Though the illustrated embodiment supports conventional binding and dispatching, the aspect shown in FIG. 2 reflects the use of the binding table 44 to store a binding for only the first of two OID's included in a request, which binding contains the location of an intermediate dispatcher 46 associated with a parent or aggregating object).

Creating an Object Reference

An object reference to a distributed object, e.g., implementation 39, is created by calling a bind function in the server application 34c for the implementation. This operation creates a new object reference which is bound to the implementation 39 for the distributed object which resides in the server application 34c. As a result of this binding operation, any invocations issued on this object reference will be routed by the ORB to this serving application 34c and dispatched to the bound implementation 39.

A binding operation creates a new instance of an ORB object reference and a stub object reference on the server. The ORB object reference is built by ORB level code which populates it with a unique OID. This OID is distinct from the OID in any other object reference maintained by the ORB for implementations in this server application 34c. The stub object reference is built by stub level code using the ORB object reference. The stub object reference maintains a reference to this ORB object reference.

In addition, the conventional binding operation creates a new entry in the ORB binding table 44. This entry contains the OID for the ORB object reference just created, a reference to the implementation being bound and a reference to the skeleton through which requests will be dispatched to the implementation. (As noted above, though the illustrated embodiments permits all implementations to be bound into the binding table 44, it does not require it.)

Duplicating an Object Reference

An object reference to a distributed object is duplicated by either performing a duplicate operation on the object reference or by passing that object reference in an operation invocation., i.e., a request from a client. When an object reference is duplicated, a new instance of both an ORB and stub object reference is created. The duplicate ORB object reference will contain the same location and identification information as the original reference and in particular it will contain the same OID.

When an object reference is passed in an operation invocation, e.g., in response to a request issued by a client, the location and identification information is marshaled and returned in the invocation. On the target side, e.g., at the client, this information is unmarshaled and a new instance of an ORB object reference is constructed which contains this information. A stub object reference 40 maintaining a reference to this newly constructed ORB object reference is also constructed.

Naming an Object Reference

An object reference is named by calling the bind operation of a naming context in the naming service. This operation associates a name with the bound object reference. The object reference can be subsequently retrieved by name from the naming service by calling the resolve method of a naming context.

The bind operation creates a new instance of a name binding object which maintains the association between the name and the object reference. The operation then populates the binding with the name and a duplicate of the object reference.

CORBA Enhancements

The illustrated embodiment permits clients 12, 14 to issues requests for all implementations maintained by server 16, without requiring that entries be kept for all of them in the binding table 44. Moreover, for example, it does not require that the server 16 create object references for many of the implementations, until requested by a client. This is particularly beneficial in providing distributed object management for complex system, such as process controllers, where the server maintains large numbers of objects—many of which may not be requested by a client during a typical session.

As noted above, the number of distinct block and parameter instances in a typical process control system is large. The typical block incorporates on average 50 distinct and publicly accessible parameters. A typical control processor, in which instances of blocks reside, has a capacity of approximately 3000 blocks. A typical system will contain on average 25 control processors. Thus a typical I/A Series® system will incorporate on average approximately 75 thousand blocks and 3.75 million parameters.

CORBA interface description language (IDL) declarations for an exemplary parameter implementation (FLOAT_VARIABLE) and block implementation (PID) are shown below:

```
// IDL
// Floating Point Variable Parameter Declaration
interface FLOAT_VARIABLE: Parameter {
    // attributes.
    attribute float value;
    readonly attribute long status;
    // etc. . . .
};
//IDL
// Proportional Integral Derivative (PID) Block Declaration
interface PID : Block {
    // Parameter attributes.
    readonly attribute FLOAT_VARIABLE MEAS;
    readonly attribute FLOAT_VARIABLE SPT;
    readonly attribute FLOAT_VARIABLE OUT;
    // etc. . . .
    //PID operation ...
};
```

In the conventional CORBA approach to referencing and naming, roughly 4 million ORB object reference bindings would be created in order to name and reference the blocks and parameters in a typical process control system. An ORB object reference binding would need to be created for each block and parameter instance in order to create an object reference which can be bound into the name service. A fundamental problem with this approach is that resources for an ORB object reference binding are consumed regardless of whether a named reference is actually ever resolved or used. In the case of parameters, it is an undue burden to require that an object reference to created simply to name the parameter in the name service. This is due to their sheer numbers and the fact that the naming of parameters is fixed by the block which contains them.

The invention overcomes this by utilizing a referencing and naming approach which consumes ORB resources for parameter objects on demand, that is, only when the name of a parameter is resolved or a reference is requested are ORB resources consumed.

ENHANCED REFERENCING AND NAMING

This section outlines an approach to enhanced referencing and naming of block and parameter objects which dramatically reduces the amount of run-time resources consumed by the server ORB 32c. Though this is illustrated in application to distributed object management for process control, those skilled in the art will appreciate that it can be readily applied in other distributed object management applications as well.

In this approach, the number of object reference bindings maintained for each block and its component parameters implementations in a server application is reduced to one. Bound to this object reference binding is a block object adapter 48 having a dispatcher (or skeleton) 46 that receives all invocations for the block and its component parameters. The dispatcher 46 dispatches invocations to the appropriate implementation, e.g., 39, by using adapter specific information stored in the block and parameter object references—namely the address (or OID) of the implementation 39 and a pointer to its skeleton 50.

In this approach, only blocks are bound into the naming service. All block implementations support the naming context interface and participate in naming operations which resolve the names of parameters contained within the block.

Block Object Adapter

The block object adapter 48 and its dispatcher 46 multiplex the use of a single object reference binding among multiple block and parameter implementations. All s object references bound by the block object adapter incorporate the same object and cluster id of this single object reference binding. All invocations through these object references are dispatched by the server ORB to the dispatch routine, e.g., skeleton 46, of the block object adapter 48. This routine 46 further resolves and dispatches the invocation to the appropriate implementation.

The block adapter 48 supports the skeleton-up call interface expected by the OA 42 for dispatching invocations. In particular, the adapter 48 provides a dispatch method 46 through which the ORB dispatches invocations targeted to the object reference biding of the adapter. When initialized, the adapter 48 uses the standard ORB binding mechanism to create a new object reference binding containing a skeleton reference which is a reference to the adapter. The OA 42 will thus dispatch invocations containing the binding's OID to the block object adapter's dispatch routine 46.

As shown in the C++ code sections below, the block object adapter 48 provides an overloaded bind method for each type of parameter and block object reference it supports. This operation creates a new object reference of the appropriate type bound to a given implementation. All object references created by the block object adapter contain the same OID as in the adapter's binding. Thus all invocations made on these references will be dispatched through the block object adapter.

object adapter's bind methods for block objects. The block object adapter 48 provides an overloaded version of the bind method for each type of block object supported by the adapter. Each version of the bind method takes a reference to a type of block implementation as its first argument, followed by a reference to a type of block object reference

```
//C++
    class BlkOA {
    private:
        // ORB Object Reference bound to this adapter.
        ORB_Object_Reference*block_object_adapter_ptr;
    public:
        BlkOA( );
        // Bind Methods for blocks:
        // Analog Input (AIN)
        // Analog Output (AOUT)
        // Proportional Integral Derivative (PID)
        bind((AIN_impl & ain_impl, AIN_ptr & ain_ref, COBRA_Environment env);
        bind((AOUT_impl & aout_impl, AOUT_ptr & aout_ref, COBRA_Environment env);
        bind((PID_impl & pid_impl, PID_ptr & pid_ref, COBRA_Environment env);
        // etc. ...
        // Bind Methods for parameters.
        bind((CHARACTER_VARIABLE_impl & char_var_impl,
            CHARACTER_VARIABLE_ptr & char_var_ref, COBRA_Environment env);
        bind((FLOAT_VARIABLE_impl & float_var_impl,
            FLOAT_VARIABLE_ptr & float_var_ref, COBRA_Environment env);
        // etc. ...
        // Dispatch method for ORB.
        int dispatch(void*impl, ORB_ServerRequest &request, COBRA_Environment &env);
    };
    typedef BlkOA * BlkOA_ptr;
//C++
    BlkOA::BlkOA( ){
        // Bind object adapter to block ORB object reference.
        block_object_adapter_ptr=
            create_orb_object_ref(/*implementation*/this,
                BLOCK_OA_TYPE_IDENTIFIER,
                /*skeleton*/ this);
}
```

Initializing the Block Object Adapter

As shown in the code excerpt below, the block object adapter 48 is initialized in the server application by calling the ORB's initialization method for the adapter. This method instantiates an instance of a block object adapter in the server application and returns a reference to it.

```
//C++
BlkOA_ptr
COBRA_ORB::BlkOA_init(int argc, char *argv [], const char*orbid,
        COBRA_Environment &env) {
    BlkOA_ptr block_object_adapter = new BlkOA( );
}
// Server main thing.
main(int argc, char *argv []) {
    // Server initialization . . .
    // Initialize block object adapter
    BlkOA_ptr block_object_adapter=orb->-BlkOA_init
    (argc, argv, O, env);
    // Continue server operation . . .
}
```

Creating a Block Object Reference

As shown in the code excerpt below, an object reference to a block object is created by calling, in the server application 34c for that block's implementation, one of the block appropriate for that implementation and finally a reference to a COBRA_environment variable. Each method creates a new object reference, returned as the second argument of the method, which is bound by the object adapter 48 to the block implementation that was passed as the first argument. Requests issued through this object reference will be routed by the ORB to this server application, dispatched by that application's ORB to this block object adapter and dispatched by the adapter to the block implementation.

```
// C++
// Server main
main(int argc, char*argv []){
    // Server initialization . . .
    // Initialize block object adapter
    BlkOA block_object_adapter=orb->BlkOA_init
    (argc, argv, O, env);
    // Construct instances of blocks.
    PID_impl block1_impl;
    // etc. . . .
    // Create block object references.
    PID_ptr block1_ptr;
    block_object_adapter->bind(block1_impl, block1_ptr, env);
    // etc. . . .
    // Continue server operation . . .
}
```

As shown in the code excerpt below, each version of the bind method is implemented by the block object adapter 48. Each method duplicates the ORB object reference bound to the block object adapter 48. The interface type identifier of the duplicate reference is modified to the value of the block's interface type. A block object adapter object reference component is then constructed and a reference to the block implementation 39 and a reference to the block skeleton 50 are marshaled into this component. The component is then inserted into the duplicate ORB object reference. Each method then constructs a new block stub object reference using the ORB object reference and returns.

the bind method takes a reference to a type of parameter implementation as the first argument, followed by a reference to a type of parameter object reference that is appropriate for that implementation and finally a reference to a CORBA environment variable. Each method creates a new object reference, returned as the second argument of the method, which is bound by the object adapter 48 to the parameter implementation that was passed as the first argument. Requests issued through this object reference will be routed by the ORB to this server application, dispatched by that application's ORB to this block object adapter and dispatched by the adapter to this parameter implementation.

```
//C++
Void Block_Object_Adapter.bind(PID_impl & block_impl, PID_ptr & block_ref,
        CORBA_Environment env) {
//Duplicate block object adapter's ORB object reference.
ORB_Object_Reference *block_orb_ref=block_object_adapter_ptr->duplicate( );
//Set the interface type of orb reference.
block_orb_ref->interfaceId(PID_TYPE_IDENTIFIER);
//Create, initialize and insert a block object adapter component into reference.
ORB_Object_Component "block_object_adapter_component =
    new ORB_Object_Component( );
block_object_adapter_component < <(void*) block_impl;
block_object_adapter_component < <(Skeleton *) block_skeleton;
block_orb_ref>insert_component(BLOCK_OBJECT_ADAPTER_COMPONENT,
        block_object_adapter_component);
//Create a block stub object reference.
block_ref=new PID_ptr(block_orb_ref);
```

Creating a Parameter Object Reference

As shown in the IDL excerpt below, an object reference to a parameter object is created by invoking an attribute assessor operation on a block object interface. Each block interface provides an assessor operation for each instance of a parameter object it contains. Each assessor operation returns an object reference to the instance of the parameter object contained within the block and denoted by the attribute.

```
//IDL
interface PID: Block{
    //Parameter attributes.
    // measured value (MEAS)
    // set point (SPT)
    // output (OUT)
    readonly attribute FLOAT_VARIABLE MEAS;
    readonly attribute FLOAT_VARIABLE SPT;
    readonly attribute FLOAT_VARIABLE OUT;
    //etc. . . .
    //PID operations . . .
}
```

```
//C++
// Typical Block Implementation
class PID_impl{
private:
    //Contained parameter implementation.
    // measured value (MEAS)
    // set point (SPT)
    // output (OUT)
    FLOATER_VARIABLE_impl MEAS_impl;
    FLOAT_VARIABLE_impl SPT_impl;
    FLOAT_VARIABLE_impl OUT_impl;
    //etc. . . .
public:
    //Assessor methods
    FLOAT_VARIABLE_ptr MEAS( );
    FLOAT_VARIABLE_ptr SPT( );
    FLOAT_VARIABLE_ptr OUT( );
    //etc. . .
    //Rest of class . . .
}
C++
// Typical Block Assessor Method
FLOAT_VARIABLE_ptr PID_impl::MEAS( )[
    FLOAT_VARIABLE_ptr MEAS_ptr,
    block_object_adapter->bind(MEAS_impl, MEAS_ptr, env);
    return MEAS_ptr,
}
```

As shown in the C++ code excerpts below, the method of the block object implementation, which implements the assessor operation, creates a parameter object reference by calling one of the block object adapter's bind methods for parameter objects. The block object adapter provides an overloaded version of the bind method for each type of parameter object supported by the adapter. Each version of the bind method is implemented by the block object adapter. Each method duplicates the ORB object reference bound to the block object adapter. As a result of the duplication operation, the new object reference includes a first OID, to wit, that of the object adapter 48. The interface type identifier of the duplicate reference is modified to the value of the parameter's interface type. A block object adapter object reference component is then constructed are marshaled into this component.

That reference, which effectively constitutes the OID of the target implementation 39, which will subsequently be used in constructing requests for the implementation, as described below. In the illustrated embodiment, the target implementation 39 is a parameter object comprising a portion of the same object construct instantiated in the server application 34a as the block object 48. As a consequence, the OID of the implementation 39 can be determined from the memory address of the parent object 48. Particularly, it can be determined by adding an address offset (e.g., stored in a table maintained in the assessor or bind code) to the parent's memory address. In implementations where the objects represented by the first and second OID's are not portions of the same object and, therefore, where the respective memory addresses cannot be determined from an offset calculation, other mechanisms (such as additional storage tables) can be used to determine the second OID.

The bind method also marshals a pointer to the skeleton 50 into the object reference component. That pointer, too, can be determined from a table maintained in the assessor or bind code.

Once the "second" OID and skeleton are marshaled into the component, it is inserted into the duplicate ORB object reference. Each method then constructs a new parameter stub object reference using the ORB object reference and returns.

```
//C++
void Block_Object_Adapter.:bind(FLOAT_VARIABLE_impl & parm_impl,
            FLOAT_VARIABLE_ptr & parm_ref,
            CORBA_Environment env){
    //Duplicate block object adapter's ORB object reference.
ORB_Object_Reference *parm_orb_ref=block_object_adapter_ptr->duplicate( );
//Set the interface type of orb reference.
param_orb_ref->interfaceId(FLOAT_VARIABLE_TYPE_IDENTIFIER);
//Create, initialize and insert a block object adapter component
into reference.
ORB_Object_Component *block_object_adapter_component =
        new ORB_Object_Component( );
block_object_adapter_component < <(void *) parm_impl;
block_object_adapter_component < <(Skeleton *) parameter_skeleton;
parm_orb_ref->insert_component_BLOCK_OBJECT_
        ADAPTER_COMPONENT, block_object_adapter_
        component);
//Create a parameter stub object reference.
parm_ref=new FLOAT_VARIABLE(parm_orb_ref);
}
```

Duplicating a Block or Parameter Object Reference

The actions performed when duplicating a block and parameter object reference is identical to those performed when duplicating a standard object reference with the exception that the block object adapter component in the ORB object reference is duplicated as well.

Invoking an Operation on a Parameter Object Reference

In order to issue a request for a parameter implementation 39, the client 12 must first obtain an object reference for it. In the illustrated embodiment, this is done by issuing a request to the corresponding assessor method of the aggregating, or "parent," block object, i.e., block object adapter 48. That request is processed in the manner described above, resulting in return to the client of an object reference containing OID's for both the parent/block object 48 and the child/parameter object 39. The OID for the latter is contained in the component portion of the object reference, along with a pointer to the skeleton 50 associated with the child/parameter object 39.

With the new object reference in hand, the client application 34a initiates an operation invocation by calling a method on the stub object reference 40 which corresponds to the desired operation on the target implementation 39; see "step 1" in FIG. 2. The stub 40 creates an ORB request using the ORB object reference and an operation identifier. The stub also marshals the parameters of the operation into the request. At this stage, the request includes only a single OID, to wit, that corresponding to the block object adapter 48.

In order to add the OID (or memory address) of the target implementation 39, the stub 40 passes the request to request level block object adapter interceptor 38, which marshals the component of the ORB object reference into the outgoing request. See step 2. This is shown in the following code excerpt:

```
//C++
void BlkOAInterceptor.:client_invoke(ORB_Request&request){
    ORB_Object_Reference *orb_obj_ref=request.orb_ref( );
    orb_obj_ref->get_component(BLOCK_OBJECT_ADAPTER_
        COMPONENT);
    request.insert_component(BLOCK_OBJECT_ADAPTER_
        COMPONENT);
    request.invoke( );
}
```

Following processing by the interceptor 38, the request is passed to the client ORB core 36. See step 3. The client ORB 36, in turn, sends a request message to the server ORB 32c in the server 16. See step 4. That message contains the parameters and identifier of the operation, the OID of the block object adapter 48 (in the encapsulated object reference) and OID and skeleton of the target implementation 39 (in the component portion of the object reference). The client ORB 36 then waits for the server ORB to reply with a response message.

When the server ORB 32c receives a request message it will construct an ORB server request from the received message and pass this to the OA 42. See step 5. The OA 42 will retrieve the OID of the target implementation from the server request and use it to lookup in the ORB binding table 44 the location of corresponding skeleton—in this case, the block object adapter dispatcher 46. See step 6.

The OA then passes the request to the dispatcher 46. See step 7. It extracts the ORB object reference contained in the server request and unmarshal the implementation and skeleton reference from the object reference's block object adapter component. The method will then dispatch the request to the implementation through the skeleton 50. See step 8 and the code excerpt below:

```
//C++
int Block_Object_Adapter.:dispatch (void *impl, ORB_ServerRequest
&request,
        CORBA_Environment& env) {
    ORB_Object_Reference * orb_ref = request.orb_ref( );
    // Unmarshal references to implementation and skeleton.
    void * implementation;
    Skeleton *skeleton;
    ORB_Object_Component *block_object_adapter_component =
        orb_ref->get_component_BLOCK_OBJECT_ADAPTER_
        COMPONENT);
```

```
    block_object_adapter_component> >implementation;
    block_object_adapter_component> >skeleton;
    // Dispatch to an implementation.
    skeleton ->dispatch(implementation, request, env);
    return OK
}
```

The skeleton's dispatch method 50 retrieves the identifier for the operation from the request and unmarshals the parameters from the server request according to the operation's signature. The skeleton 50 will then call and pass the unmarshaled parameters to the method on the implementation 39 which corresponds to the operation. See step 9. When the call returns, the skeleton 50 will marshal the results returned by the method into the server request and then return itself.

When the call to the skeleton 50 returns, the OA 42 will call a reply method of the ORB server request. This method will send a response message to the ORB request in the client ORB containing the results of the operation.

When the invocation method of the ORB request receives a response message, it will return to the stub object reference 40 method. This method will then unmarshal the results of the operation from the ORB request and return to the client.

Naming a Block

Any object name supported by the naming service can be associated with a block object. Block object references are named in the standard fashion outlined previously. A duplicate of the object reference is bound into a name binding maintained by a naming context in the name service.

Naming a Parameter

The initial name of a parameter object is fixed by the naming context implemented by the block implementation containing the parameter. Additional names can be associated, however, with the parameter by binding references to the parameter elsewhere in the name service.

Resolving a Parameter Name

A name to a parameter object is resolved in the naming context implemented by the block which contains the parameter. This naming context is bound into the naming service using the bind_space operation of the context's parent naming context. The resolve operation of the block's naming context is implemented by the resolve method of the operation. This method compares the name being resolved against the set of parameter names defined for the block. If a match is found, the method returns a reference to the matched parameter using the parameters assessor method. An exception is returned otherwise.

```
CORBA_Object_ptr PID_impl::resolve(PathName_ptr pathname,
CORBA_Environment env) {
if (pathname->id( ) == "MEAS") {
    return MEAS( );
}
if (pathname->id( ) == "SPT") {
    return MEAS( );
}
```

```
if (pathname->id( ) == "OUT") {
    return MEAS( );
}
// etc. . . .
// Invalid parameter specified.
InvalidPath bad_name;
env.exception(bad_name);
return CORBA_Object:_nil( );
}
```

Note that the block's implementation of all other naming operations return an exception always. The block's naming context is fixed and can not be modified.

SUMMARY

Described above are systems and method achieving the objects set forth above. Those skilled in the art will appreciate that the illustrations and descriptions above relate merely a few embodiments of the invention and that other embodiments, incorporating changes therein, fall within the scope of the invention. Thus, by way of example, it will be appreciated that aggregating relationships are not limited to block and parameter objects. Moreover, by way of example, it will be appreciated that an object represented by a second OID contained in a request need not form part of the object identified by the first OID.

In view of the foregoing, we claim:

1. In a digital data processing system with distributed object management, the system having a server that routes requests generated by one or more clients to implementation objects that are maintained by a server, where the routing is based on an information store maintained by the server that identifies request dispatchers, the improvement wherein the server utilizes an entry in the information store to route requests to a plurality of different implementation objects maintained by the server, the server generates a first object reference (OR) corresponding to a first implementation object, the first OR including the first OID, and the server generates a second OR corresponding to a second implementation object, the second OR including the first and second OID's, the second OID being generated as a function of the first OID, a client generates a request that includes the first OID and the second OID, the client determining the first and second OIDs for inclusion in the request from a copy of the second OR, the server is responsive to an information store entry matching a first OID in a request for applying at least a portion of the request to a first request dispatcher, the first request dispatcher responds to at least a portion of a request applied thereto for applying at least a portion of the request to a second request dispatcher, the second request dispatcher being associated with the second OID included in that request, the second request dispatcher responds to at least a portion of the request applied thereto by invoking a requested service on an implementation object identified by the second OID included in that request.

2. In a system according to claim 1, the improvement wherein at least selected requests include an identification of the second request dispatcher.

3. In a system according to claim 1, the improvement wherein a plurality of requests for invocation of services on different respective implementation objects have the same first OID.

4. In a system according to claim 3, the further improvement wherein that same first OID is included in an information store entry identifying a first request dispatcher to which the server applies at least portions of those requests.

5. In a system according to claim 4, the further improvement wherein the first request dispatcher applies portions of the requests to second respective request dispatchers, each associated with the second OID included in the respective requests.

6. In a system according to claim 5, the further improvement wherein the second request dispatchers invoke requested services on respective implementation objects identified by the respective second OID's included in the requests.

7. In a method for digital data processing system with distributed object management, the method utilizing a server that routes requests generated by one or more clients to implementation objects that are maintained by the server and that are identified in the requests, where the routing based on a binding table that identifies skeletons for invocation of requested services on the implementation objects, the improvement comprising generating with the server a first object reference (OR) corresponding to the first implementation object, the first OR including a first object identifier (OID) corresponding to an addressable location of the first implementation object, generating with the server a second OR, corresponding to a second implementation object, the second OR including the first and second OID's, the server generating the second OR in response to a request for an accessor service of the first implementation object, the request identifying a type of the second implementation object, storing in the binding table an identification of a skeleton associated with the first OID, passing the second OR from the server to the client, generating with the client at least selected requests including a first object identifier (OID) and a second OID, where the client determines the first OID and the second OID from the second OR, utilizing a single binding table entry to route requests to the first and second implementation objects.

* * * * *